United States Patent Office 3,787,440
Patented Jan. 22, 1974

3,787,440
3-SULFAMYL-4-CHLOROBENZOIC ACID DERIVATIVES
Sachiyuki Hamano and Takaharu Nakamura, Tokyo, Shizuo Kuriyama, Saitama Prefecture, and Motosuke Yamanaka, Tokyo, Japan, assignors to Eisai Co., Ltd., Tokyo, Japan
No Drawing. Filed Nov. 9, 1971, Ser. No. 197,119
Claims priority, application Japan, Nov. 9, 1970, 45/97,931
Int. Cl. C07d 27/48
U.S. Cl. 260—326.1      5 Claims

ABSTRACT OF THE DISCLOSURE

New 3-sulfamyl-4-chlorobenzoic acid derivatives, more particularly, 2-chloro-5-{2-[4,7-methano-$\Delta^5$-tetrahydro (or 4,7-methanohexahydro)-isoindolinocarbonyl (or isoindolino-aminocarbonyl)]}benzene sulfonamide having marked diuretic and anti-hypertensive activities with low toxicity, as well as the synthetic preparation thereof are provided. The new compounds may advantageously be administered per os for therapeutical treatment of diseases such as cardiac, renal and hepatic edemas and also of hypertensions such as essential, renal and juvenile hypertensions.

---

This invention relates to the new pharmacologically useful 3-sulfamyl-4-chlorobenzoic acid derivatives and synthetic preparation thereof. More particularly, the invention is concerned with 2-chloro-5-{2-[4,7-methano-$\Delta^5$-tetrahydro (or 4,7-methanohexahydro)-isoindolino-carbonyl (or isoindolino-aminocarbonyl)]} benzene sulfonamide represented by the formula

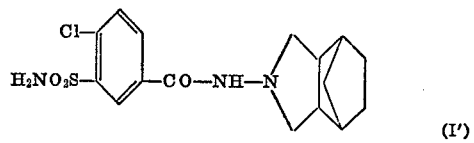

(I)

wherein —A< is —N< or —HN—N<, and wherein the bonding including the dotted line means a single or double bond, as well as synthetic preparation thereof.

The process for the synthetic preparation of the particular compounds contemplated in the present invention may be represented by the following schematic chemical reaction:

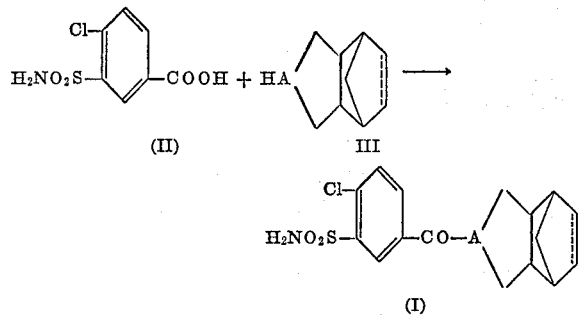

In the above, A's have the same meaning as in Formula I.

Namely, in practice of the invention, 3-sulfamyl-4-chlorobenzoic acid of the Formula II or a functional acid derivative thereof is subjected to reaction with 4,7-methano-$\Delta^5$-tetrahydro (or 4,7-methanohexahydro)-isoindoline or N-amino compound thereof.

Where an acid halide is employed as the said acid functional derivative of the Compound II, a smooth reaction can be effected by adding an acid-binding agent such as potassium bicarbonate, triethylamine or the like to the reaction system, whereas when an ester of the Compound II is employed as the said acid functional derivative, addition of triethylamine, sodium amide or the like to the reaction system is desirable for the reaction performance.

The new compounds of the persent invention are characterized by their marked diuretic and anti-hypertensive activities. By way of explanation, with the maximum effective oral administration of 2.5 mg./kg. b.w. of 2-chloro-[4,7 - endomethanohexahydro - isoindolino - aminocarbonyl]benzene sulfonamide of the formula

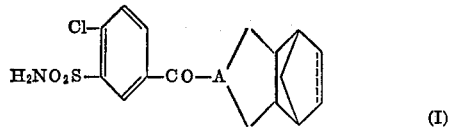

(I′)

for example, it was observed that there is no appreciable alteration in the volume of excreted urine as compared with that of excreted urine after oral administration of the known hydrochlorothiazide which at present has broadly been employed as diuretic and anti-hypertensive agents. However, it is surprising that the contents of sodium ion ($Na^+$) and chlorine ion ($Cl^-$) in the former urine due to the administration of the compound (I′) were 130–150% of those contained in the latter urine due to the administration of the Compound IV, and unexpectedly, the increment in concentration of potassium ion ($K^+$) in the former urine was only 50% of that of the latter urine.

It is therefore recognizable that any serious side-effect due to potassium deficiency in blood would be avoidable, even if the compounds of the present invention are administered as diuretic and anti-hypertensive agents.

Inacidentally, it is known that with a prolonged administration of hydrochlorothiazide, its activity gradually diminishes, because of formation of tolerance to the drug. It is therefore highly appreciated that no such drawback as the above was observed in the administration of the Compound I′.

Outstanding anti-hypertensive activity of the Compound I′ was also observed. In successive oral administration of 5 mg./kg. b.w./day for six days of the compound to hypertensive rats caused by treating them with DOCA, desoxycorticosterone acetate, their initial blood pressure of 180 mm. Hg finally depressed to 150 mm. Hg or less. Such a marked anti-hypertensive activity could not be achieved with the administration of hydrochlorothiazide.

Contrary to the high acute toxicity in mice of hydrochlorothiazide of $LD_{50}$=3.5 mg./kg. b.w., no dead mice were observed when 4 g./kg. b.w. of the Compound I′ were administered per os.

It will therefore be seen that the compounds embraced by the aforementioned Formula I according to the present invention are useful as secure diuretic and anti-hypertensive agents. The compounds are thus utilizable for the therapeutic treatment of cardiac, renal and hepatic edemas and the impediments of blood vessels due to hypertension as well as the treatment of essential, renal and juvenile hypertensions, etc.

Administration per os of the compounds encompassed by the Formula I may be effected in a form of various preparations such as tablets, pills, granules and powders. The preparations should usually be administered in an amount of 50–300 mg. day and preferably 100–150 mg./day for adults.

Following examples serve to illustrate the invention.

EXAMPLE 1

Synthesis of 2-chloro-5-[2-(4,7-exomethanohexahydro-isoindolinocarbonyl)]benzene sulfonamide 1.5 grams of 4,7-exomethanohexahydro-isoindoline and 1.0 grams of triethylamine were dissolved in 50 ml. of chloroform.

To the solution were added portionwise under stirring 2.5 grams of 3-sulfamyl-4-chlorobenzoyl chloride. When the addition was over, the whole was kept with stirring at room temperature for 5 hours to perform the reaction. Chloroform was distilled off from the reaction mixture, and a quantity of water was added to dissolve the residue. White precipitate separated out from the aqueous layer was recovered by filtration, washed well with water, dried by weathering and recrystallized from ethanol.

There was obtained 1.7 grams of the product having the melting point of 229°–231° C.

Elementary analysis of the product as $C_{16}H_{19}ClN_2O_3S$ gave:

Found (percent): C, 54.00; H, 5.50; N, 8.20. Calculated (percent): C, 54.14; H, 5.39; N, 7.89.

EXAMPLE 2

Synthesis of 2-chloro-5-[2-(4,7-endomethanohexahydro-isoindolinocarbonyl)]benzene sulfonamide 1.5 grams of 4,7-endomethanohexahydro-isoindoline were subjected to reaction with 2.5 grams of 3-sulfamyl-4-chlorobenzoyl chloride and the reaction product was worked up in accordance with the procedures disclosed in the preceding example.

There was obtained the contemplated compound at the yield of 2.7 grams. The compound had the melting point of 204°–205° C.

Elementary analysis of the product as $C_{16}H_{19}ClN_2O_3S$ gave:

Found (percent): C, 54.17; H, 5.48; N, 7.69. Calculated (percent): C, 54.14; H, 5.39; N, 7.89.

EXAMPLE 3

Synthesis of 2-chloro-5-[2-(4,7-exomethano-$\Delta^5$-tetrahydro-isoindolinocarbonyl)]benzene sulfonamide 1.5 grams of 4,7-exomethano-$\Delta^5$-tetrahydro-isoindoline and 1.5 grams of sodium amide were dissolved in 100 ml. of benzene. To the resulting solution were added 3.0 grams of 3-sulfamyl-4-chlorobenzoyl ethylester, and the whole was subjected to reaction under heat for 3 hours. When the reaction was completed, the reaction mixture was allowed to cool. Benzene was then distilled off from the mixture. The residue was dissolved into ether and washed well with water. The etheral solution was dried on anhydrous sodium carbonate and the ether was then distilled off.

The residue was recrystallized from ethanol. There was obtained 1.7 grams of the contemplated compound having the melting point of 205°–207° C.

Elementary analysis of the compound as $C_{16}H_{17}ClN_2O_3S$ gave:
Found (percent): C, 54.45; H, 4.85; N, 7.66. Calculated (percent): C, 54.45; H, 4.85; N, 7.93.

EXAMPLE 4

Synthesis of 2-chloro-5-[2-(4,7-endomethanohexahydro-isoindolino-aminocarbonyl)]benzene sulfonamide 1.8 grams of N-amino-4,7-endomethanohexahydro-isoindoline and 2.5 grams of 3-sulfamyl-4-chlorobenzoyl ethylester were reacted together and the resulting reaction mixture was further worked up in accordance with the procedures disclosed in Example 3.

There was obtained 1.8 grams of the contemplated compound having the melting point of 249°–250° C.

Elementary analysis of the product as $C_{16}H_{20}ClN_3O_3S$ gave:

Found (percent): C, 51.71; H, 5.68; N, 10.86. Calculated (percent): C, 51.95; H, 5.45; N, 11.36.

EXAMPLE 5

Preparation of the tablets 300 grams of 2-chloro-5[2-(4,7-endomethanohexahydro-isoindolino-aminocarbonyl]benzene sulfonamide prepared in Example 4 and 2000 grams of lactose were thoroughly admixed and the resulting mixture was sifted through a 30 mesh sieve.

Apart from the above, 100 grams of corn starch were kneaded with 350 ml. of distilled water to a paste.

The aforementioned sifted mixture was well mixed with the paste and the mass was shifted through a 4 mesh sieve to the nodules. The latter were dried at 50° C. for 15 hours. The dry nodules were treated on a granulating machine and the granules were then shifted through a 16 mesh sieve. The resulting granules were coated with a blend which had been prepared by blending 45 grams of calcium stearate, 250 grams of corn starch and 100 grams of talc and shifting the blend through a 40 mesh sieve.

Tablets each containing 25 mg. of the said active ingredient were made of the coated granules as usual.

What is claimed is:

1. 2 - chloro - 5 - {2-[4,7-methano-$\Delta^5$-tetrahydro (or 4,7-methanohexahydro)-isoindolinocarbonyl (or isoindolinoaminocarbonyl)]}benzene sulfonamide represented by the formula

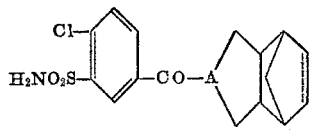

wherein —A< is —N< or —HN—N<.

2. 2 - chloro - 5 - [2 - (4,7 - exomethanohexahydro-isoindolinocarbonyl)]benzene sulfonamide, according to claim 1.

3. 2 - chloro - 5 - [2 - (4,7 - endomethanohexahydro-isoindolinocarbonyl)]benzene sulfonamide, according to claim 1.

4. 2 - chloro - 5 - [2 - (4,7 - exomethano - $\Delta^5$ - tetrahydro-isoindolinocarbonyl)]benzene sulfonamide, according to claim 1.

5. 2 - chloro - 5 - [2 - (4,7 - endomethanohexahydro-isoindolinoaminocarbonyl)]benzene sulfonamide, according to claim 1.

References Cited

UNITED STATES PATENTS 3,503,962  3/1970  Beregi et al. ___ 260—326.1 X R

FOREIGN PATENTS 1,557,903  1/1969  France _____ 260—326.1

JOSEPH A. NARCAVAGE, Primary Examiner

U.S. Cl. X.R.

424—274